US005728220A

United States Patent [19]
Curcuri et al.

[11] Patent Number: 5,728,220
[45] Date of Patent: Mar. 17, 1998

[54] TIRE SOAPER APPARATUS

[75] Inventors: Thomas J. Curcuri, Grosse Pte. Woods; Jack T. Curcuri, Clinton Township; Craig J. Hudock, Utica, all of Mich.

[73] Assignee: Ultimation, Inc., Roseville, Mich.

[21] Appl. No.: 613,166

[22] Filed: Mar. 8, 1996

[51] Int. Cl.⁶ ........................................ B05B 13/02
[52] U.S. Cl. ........................ 118/324; 118/323; 118/305; 157/20; 414/426
[58] Field of Search ............... 118/323, 324, 118/320, 321, 322, 317, 318, 305, 306; 134/123, 124, 129, 131, 172; 414/426, 433; 157/20

[56] References Cited

U.S. PATENT DOCUMENTS

| | | |
|---|---|---|
| 2,470,534 | 5/1949 | Thomas . |
| 2,488,376 | 11/1949 | Clauser . |
| 2,910,117 | 11/1959 | Lamerson . |
| 3,461,938 | 8/1969 | Mueller . |
| 3,658,152 | 4/1972 | Mueller . |
| 3,978,903 | 9/1976 | Mueller et al. . |
| 4,061,173 | 12/1977 | Daly . |
| 4,183,392 | 1/1980 | Kane . |
| 4,420,026 | 12/1983 | Goiseau . |
| 4,563,975 | 1/1986 | Kozlowski et al. . |
| 4,723,563 | 2/1988 | Kane . |
| 4,800,944 | 1/1989 | Kane . |
| 4,881,488 | 11/1989 | Fantucci ............... 118/320 |
| 5,065,694 | 11/1991 | Earnheart, Jr. . |
| 5,094,284 | 3/1992 | Curcuri . |
| 5,141,040 | 8/1992 | Curcuri . |
| 5,170,828 | 12/1992 | Curcuri . |
| 5,417,763 | 5/1995 | Diepens . |

Primary Examiner—Donald E. Czaja
Assistant Examiner—Calvin Padgett
Attorney, Agent, or Firm—Peter D. Keefe

[57] ABSTRACT

A tire soaper apparatus including a soaper station and a conveyor for selectively advancing tires to the soaping station. The soaping station is characterized by a translationally mounted rotator for being moved into engagement with a tire to thereby rotate it, a pivotally mounted soap applicator located above the conveyor for selectively contacting the beads of the tire, and a soap dispensing circuit for selectively providing soap at the soap applicator for applying soap to the beads of the tire. The soap applicator is pivoted into the central opening of the tire and engages, via bead receptacles, each of the beads thereof. The tire is rotated by the rotator rotating against the tread of thereof, wherein the rotator moves translationally toward the soap applicator so that the tire is squeezed therebetween with the beads seated in the bead receptacles and soap transferred to the beads as the tire rotates in relation to the soap applicator. A kicker is provided for laterally moving the tire out of the way to a secondary conveyance for delivering the tire to a tire mounting apparatus. Preferably, operation of the tire soaper apparatus is processor controlled to thereby optimize operation.

15 Claims, 7 Drawing Sheets

TIRE SOAPER APPARATUS

BACKGROUND OF THE INVENTION

1. Field of the Invention

The present invention relates to tire soaper apparatus used to soap the beads of a tire preceding its being mounted to a wheel. More particularly, the present invention relates to a tire soaper which provides minimal soap waste yet provides thorough soaping of tire beads.

2. Description of the Prior Art

Pneumatic tubeless tires must be sealingly mounted to the respective wheels. In this regard, the seal between the beads of the tires and the rims of the wheels is critical. In order to achieve an air tight seal between the rims and the beads, the beads are coated by soap prior to mounting the tire onto its wheel. The soap provides reduced friction as the beads are slipped over the rims and further provides a film for aiding the seal between the rims and the beads.

When one, two or an otherwise low volume of tires are to be mounted to wheels, a rag, brush or sponge can be dipped in soap and then run around the beads to provide a soap film thereto prior to wheel mounting. However, in industrial facilities associated with automotive production, high volume mounting of tires to wheels is routinely involved. In order to provide the necessary high volume soaping operation, automated tire soaping apparatus are used for this purpose. Apparatus of this type are generally described for example in U.S. Pat. Nos. 4,723,563, 4,563,975, and 3,658,152. Tire soaping apparatus are generally not soap efficient, especially those employing soap spray systems. Soap waste is not merely a cost consideration, as waste soap can get into the tire prior to mounting and then be trapped therein potentially causing wheel balance problems. U.S. Pat. No. 3,658,152 addresses minimization of soap waste, but the requirement that the tire be vertically supported on a rotating roller which is itself immersed partly in soap, renders it generally complex as compared to spray soapers.

What remains needed in the art is a tire soaper apparatus which is truly simple in structure and operation, provides for minimization of soap waste, and yet provides well soaped tire beads in a high volume, automated environment.

SUMMARY OF THE INVENTION

The present invention is a tire soaper apparatus which is truly simple in structure and operation, provides for minimization of soap waste, and yet provides well soaped tire beads in a high volume, automated environment.

The tire soaper apparatus according to the present invention includes a soaper station and a conveyor for selectively advancing tires to the soaping station. The soaping station is characterized by a translationally mounted rotator for being moved into engagement with a tire to thereby rotate it, a pivotally mounted soap applicator located above the conveyor for selectively contacting the beads of the tire, and a soap dispensing circuit for selectively providing soap at the soap applicator for applying soap to the beads of the tire.

The soap applicator is pivoted into the central opening of the tire and engages, via bead receptacles, each of the beads thereof. The tire is rotated by the rotator rotating against the tread of thereof, wherein the rotator moves translationally toward the soap applicator so that the tire is squeezed therebetween with the beads seated in the bead receptacles and soap transferred to the beads as the tire rotates in relation to the soap applicator. A kicker is provided for laterally moving the tire out of the way to a secondary conveyance for delivering the tire to a tire mounting apparatus.

Preferably, operation of the tire soaper apparatus is processor controlled to thereby optimize operation. Preferably further, rotation and translation of the rotator, soap applicator pivot mechanism, and soap dispensing are all pneumatically actuated and controlled by the processor.

Accordingly, it is an object of the present invention to provide a tire soaper apparatus which provides thorough soaping of the beads of a tire yet minimizes waste of the soap.

It is an additional object of the present invention to provide a tire soaper apparatus which seats the beads of the tire in respective bead receptacles for providing thorough soaping of the beads.

It is another object of the present invention to provide a tire soaper apparatus which seats the beads of the tire in respective bead receptacles for providing thorough soaping of the beads, wherein the tire is laying on its side theredur­ing.

It is a further object of the present invention to provide a tire soaper apparatus which seats the beads of the tire in respective bead receptacles for providing high speed soaping of the beads.

It is yet a further object of the present invention to provide a tire soaper apparatus which seats the beads of the tire in respective bead receptacles for providing thorough soaping of the beads, where a processor controlled measure of soap is delivered under pressure to the tire soaper for transfer to the tire.

It is still a further object of the present invention to provide a tire soaper apparatus which seats the beads of the tire in respective bead receptacles for providing thorough soaping of the beads, where a processor controlled measure of soap is delivered under pressure to the tire soaper for transfer to the tire, and wherein the tire soaper is soap purged during each cycle of operation.

It is still another object of the present invention to provide a tire soaper apparatus which seats the beads of the tire in respective bead receptacles for providing thorough soaping of the beads, wherein a wide range of tire sizes is accommodated.

These, and additional objects, advantages, features and benefits of the present invention will become apparent from the following specification.

DETAILED DESCRIPTION OF THE PREFERRED EMBODIMENT

Figure 1:
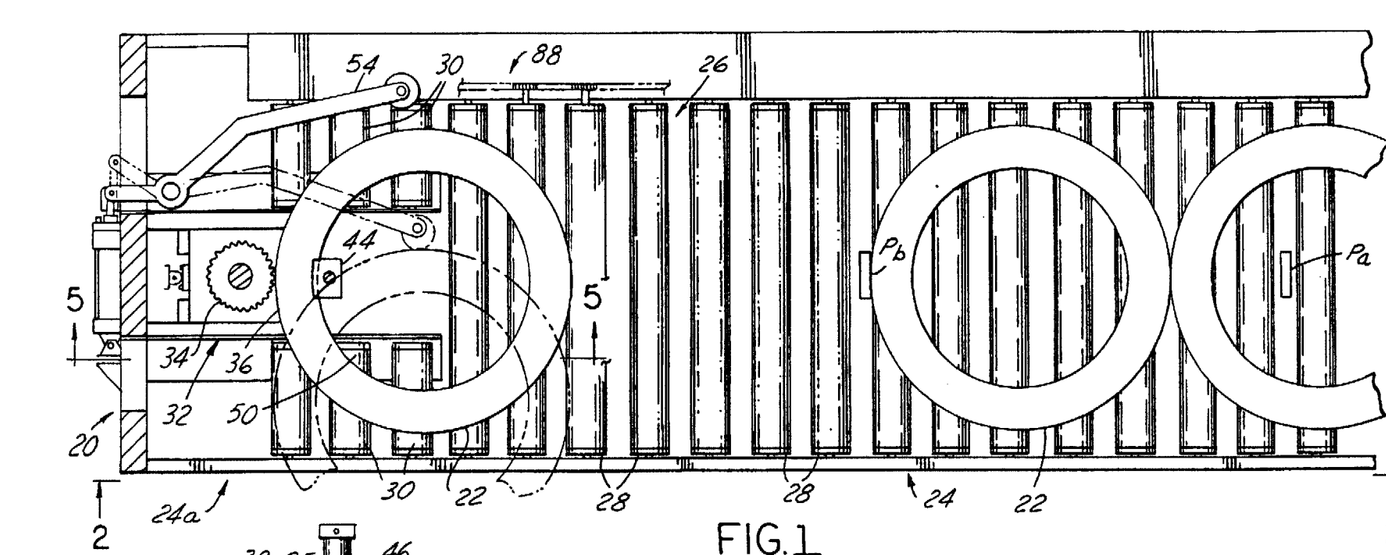
FIG. 1 is a partly sectional top view of the tire soaper apparatus according to the present invention, shown in operation with respect to a plurality of tires.
Figure 2:
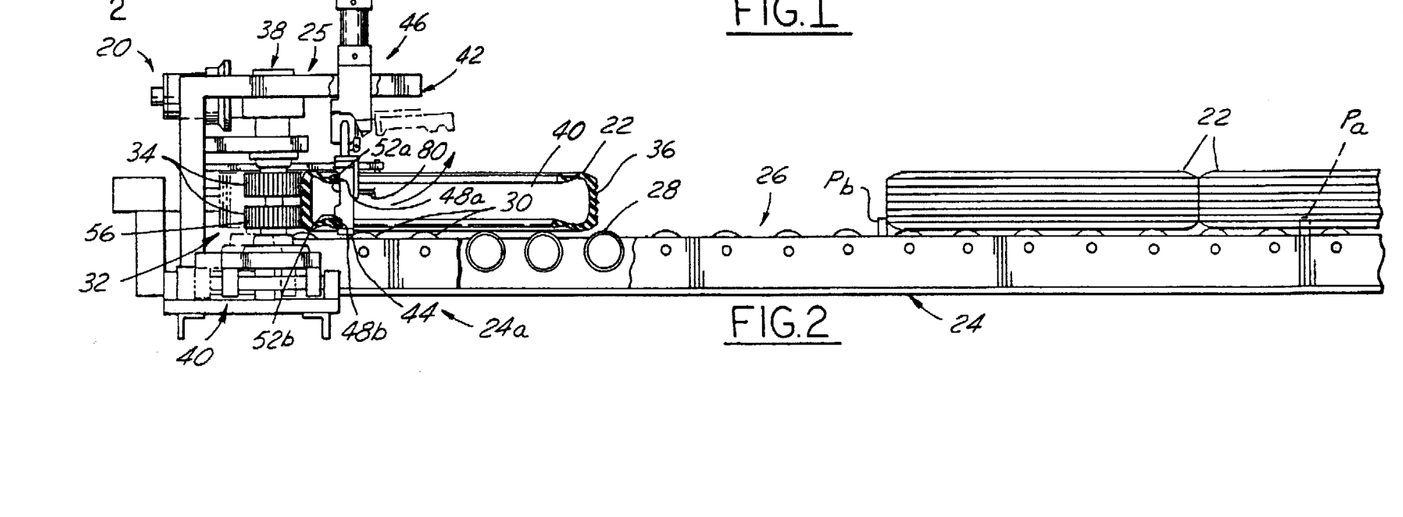
FIG. 2 is a side view, along line 2—2 of FIG. 1, of the tire soaper apparatus according to the present invention, shown in operation with respect to a plurality of tires.

Referring now to the Drawing, an overview of the present invention can be discerned from FIGS. 1 and 2, wherein depicted is the tire soaping apparatus 20 in operation with respect to a plurality of tires 22. The tire soaper apparatus 20 has a base frame 24 and a soaping station 25 located at a head portion 24a of the base frame. More particularly, the tire soaper apparatus 20 includes a conveyor 26 composed of a plurality of driven rollers 28, a plurality of free rollers 30 at the soaping station 25, and first and second stop pins $P_a$, $P_b$ for regulating tire advancement. The tire soaper apparatus 20, at the soaping station 25, also includes a spinner 32 composed of a cylindrically shaped rotator 34 structured for engaging the tread 36 of a tire 22 to thereby cause the tire to spin as the rotator spins, a rotary drive 38 for the rotator and a translational drive 40 for the rotator. The tire soaper apparatus 20 further includes, at the soaping station 25, a soaper 42 composed of a soap applicator 44 and a pivot mechanism 46 situated above the conveyor 26 for pivoting the soap applicator into position with respect to a tire to thereby provide soap to the beads 48a, 48b of a tire 22 situated at the soaping station, the soap applicator pivoting into and out of the central opening 40 of the tire.

Operation of the tire soaper apparatus 20 is electronic processor controlled to perform as follows. A tire 22 is advanced by the conveyor 26 to the soaping station 25, whereupon the soap applicator 44 pivots downwardly to its deployed position into the central opening 50 of the tire, wherein bead receptacles 52a, 52b formed in the body 45 of the soap applicator 44 align with respective beads 48a, 48b. The rotator 34 commences rotation and advances translationally toward the soap applicator to thereby squeeze the tire therebetween. The tire commences spinning and soap is delivered through a soap circuit to openings in the soap applicator whereby the beads of the tire become soap coated. Thereupon, soap delivery ceases, the soap circuit at the soap applicator is purged of soap, and the rotator retreats translationally away from the soap applicator, whereupon the tire is no longer rotatably driven. The soap applicator thereupon pivots upwardly to its retracted position out of the way of tire advancement, and a kicker 54 is then actuated to laterally eject the tire to another conveyance for being mounted to a tire at a tire mounting apparatus (not shown). The conveyor then advances a second tire to the soaping station and another soaping cycle commences.

Referring now additionally to the remaining figures, the structure and function of the tire soaper apparatus 20 will be described with greater specificity.

Referring in particular to FIGS. 3 through 8, the soaping station 25 located at the head portion 24a of the base frame 24 will be described firstly.

Figure 3:
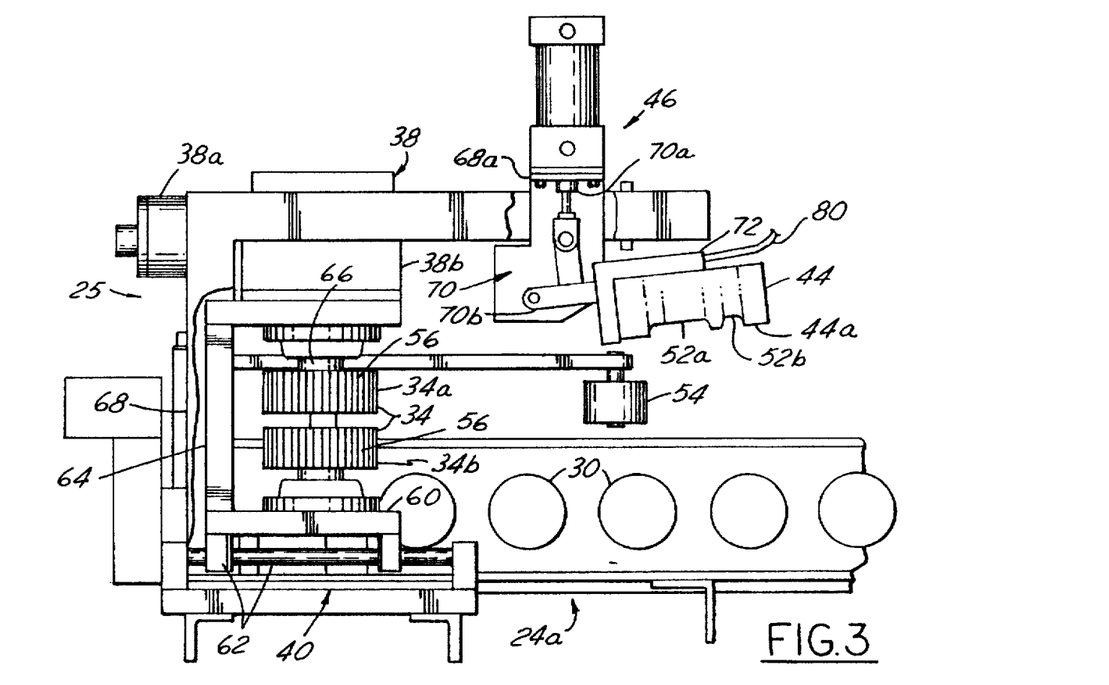
FIG. 3 is a detail side view of the tire soaper apparatus according to the present invention, showing the tire soaping station thereof awaiting delivery of a tire thereto.
Figure 4:
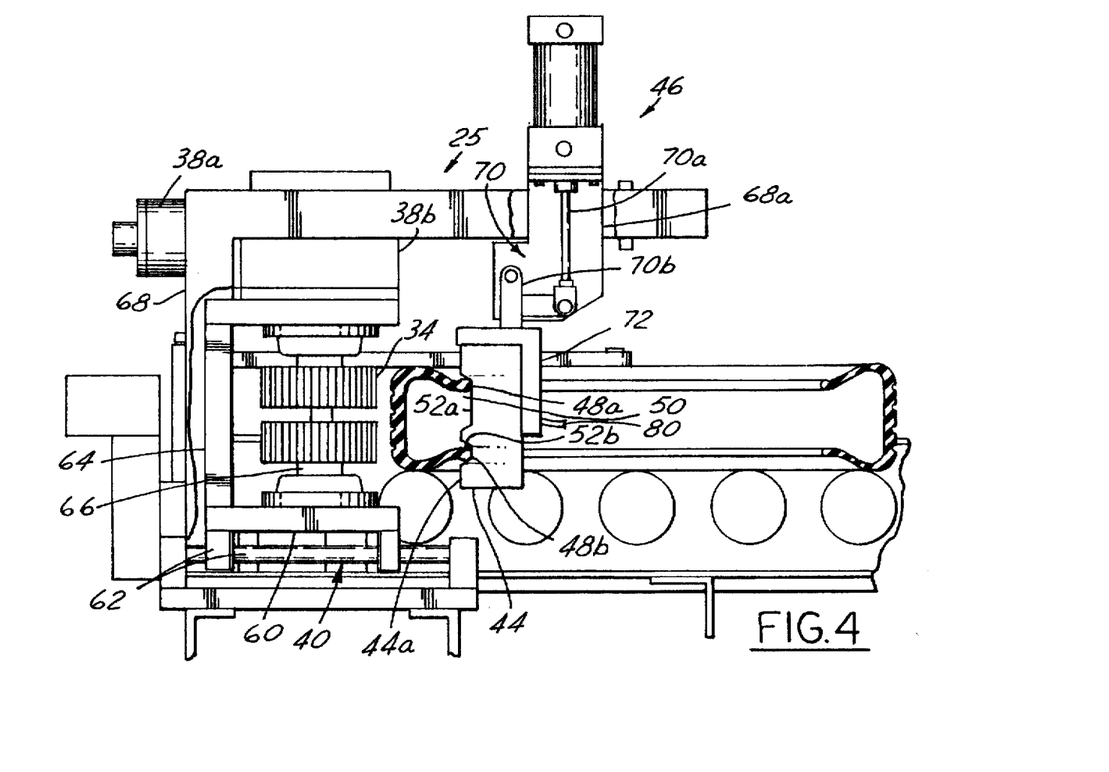
FIG. 4 is a detail side view of the tire soaper apparatus as in FIG. 3, showing the tire soaping station thereof initially engaged with respect to a tire.
Figure 5:
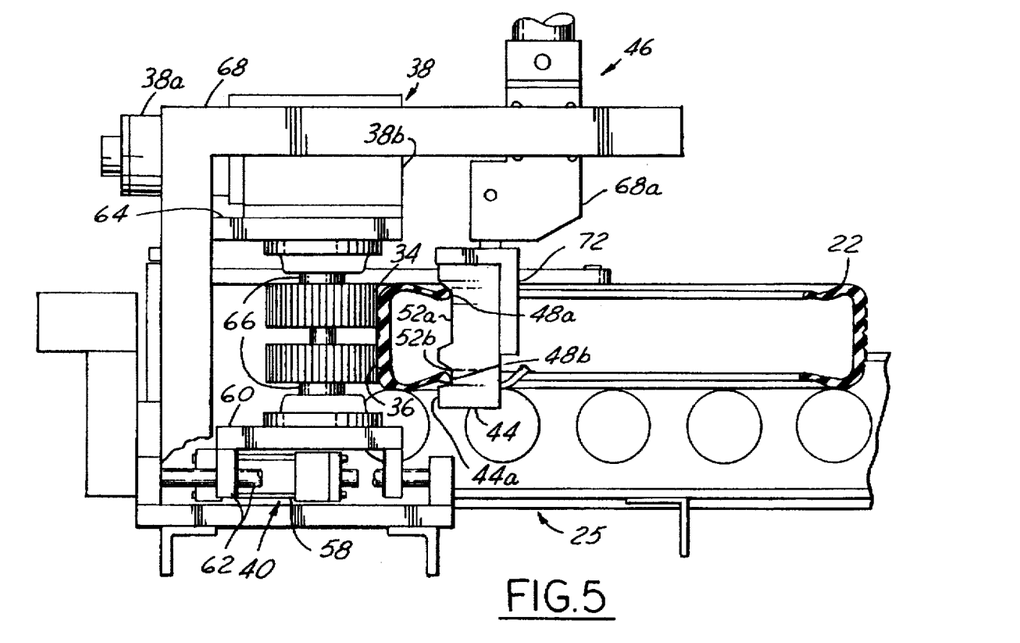
FIG. 5 is a detail side view of the tire soaper apparatus as in FIG. 3, showing the tire soaping station thereof fully engaged with respect to a tire whereby soap is being transferred to the beads thereof.

The spinner 32 includes the aforementioned cylindrically shaped rotator 34, wherein flutes 56 are provided on the periphery thereof at an orientation parallel with the axis of rotation of the rotator (defined along the shaft 66 of the rotator) to thereby enhance tractional engagement with the tread 36 of a tire 22a. Preferably, the rotator 34 is bifurcated into upper and lower rotator components 34a, 34b for optimally engaging tires of varying size.

The translational drive 40 is mounted to the head portion 24a of the base frame 24. An actuator 58, preferably a pneumatic piston-cylinder, is connected at one end to the base frame 24 and at the other end to a carriage 60. Of course, other actuators could be employed, such as an electric motor and ball screw combination. The carriage 60 is slidably mounted to the base frame 24 via a pair of slide rail and bushing sets 62 located on either side of the actuator 58. A rotary drive mounting bracket 64 is connected with the carriage 60.

The rotary drive 38 is preferably a pneumatically driven motor 38a, such as for example a Gast model 4AM-NRV-70C, which is coupled to one end of the shaft 66 of the rotator 34 via a gear reducer 38b, such as for example an Electra-Gear model 177RHSC53OR. Of course, other drive devices could be utilized, such as an electric motor. The rotary drive 38 is mounted to the rotary drive mounting bracket 64, so as to be movable with the carriage 60 in response to actuation of the actuator 58. The shaft 66 is mounted at its other end to a bushing connected with the carriage 60.

The soaper 42 includes the aforementioned soap applicator 44, wherein upper and lower bead receptacles 52a, 52b are provided for respectively receiving therein the beads 48a, 48b of a tire. In this regard, since the soap applicator 44 is pivoted downwardly into its deployed position whereat it is situated in the central opening 50 of the tire, the upper and lower bead receptacles 52a, 52b, as well as the front face 44a, are concavely shaped to generally match the contour of the beads 48a, 48b.

Figure 8:
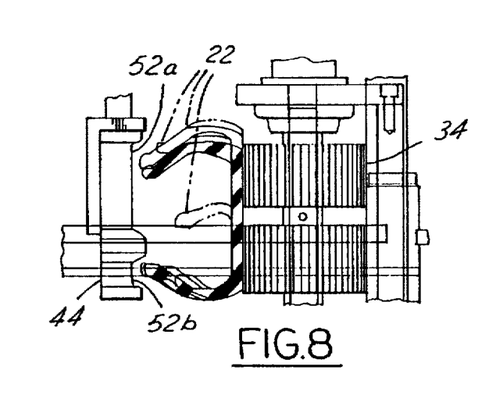
FIG. 8 is a detail side view of the soap applicator and tire rotator components of the tire soaper apparatus, shown engaged with respect to tires of various size.
Figure 9:
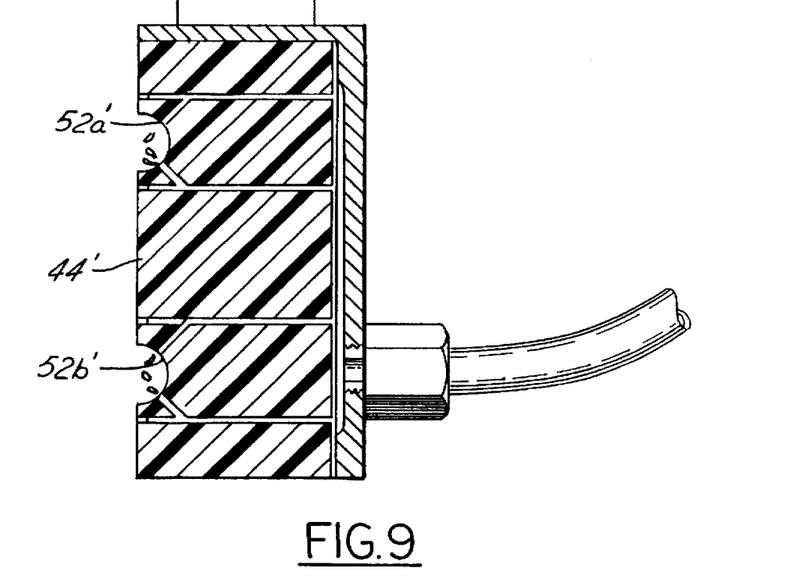
FIG. 9 is a sectional side view of an alternative soap applicator of the tire soaper apparatus according to the present invention.

As depicted by FIG. 8, the upper bead receptacle 52a is longitudinally elongated, whereas the lower bead receptacle 52b is longitudinally localized. Because of this structural feature, various sizes of tires 22, as shown in phantom, are accommodated by the soap applicator 44. In this regard, one bead 48b (the bead closest the conveyor rollers) of the various sized tires is commonly receivable into the lower bead receptacle 52b. However, in order for the other bead 48a (the bead farthest from the conveyor rollers) to be received into the upper bead receptacle 52a, an elongation thereof is necessary to accommodate the range of tire widths. In order to facilitate engagement with the beads, the upper and lower bead receptacles 52a, 52b are ramped or otherwise beveled at the respective ends thereof (see FIG. 6). However, for applications where one size of tire is routinely soaped, an alternative embodiment of the soap applicator 44' exemparily shown in FIG. 9 may be used, wherein each of the upper and lower bead receptacles 52a', 52b' are both longitudinally localized.

The pivot mechanism 46 is mounted to a pivot mechanism bracket 68, via a mounting bracket 68a, wherein the pivot mechanism bracket is connected to the head portion 24a of the base frame 24. The pivot mechanism is preferably in the form of an actuator and crank set 70, preferably wherein the actuator 70a thereof is a pneumatic piston-cylinder, such as for example an ISI clamp cylinder, model FU106-A-3A-P2-S3-C1-2 1/2-FM3-2CPC1. The crank arm 70b of the actuator and crank set 70 is pivotally connected to the mounting bracket 68a and extends outwardly therefrom and terminates in a soap applicator bracket 72. The soap applicator 44 is connected to the soap applicator bracket by threaded fasteners 74 (see FIG. 6).

Figure 6:
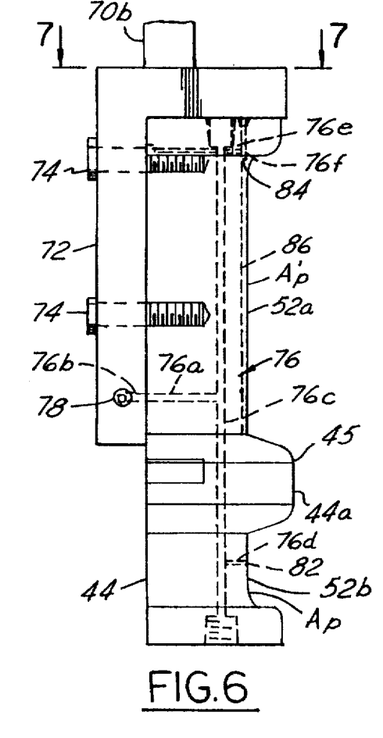
FIG. 6 is a side view of the soap applicator of the tire soaper apparatus according to the present invention.
Figure 7:
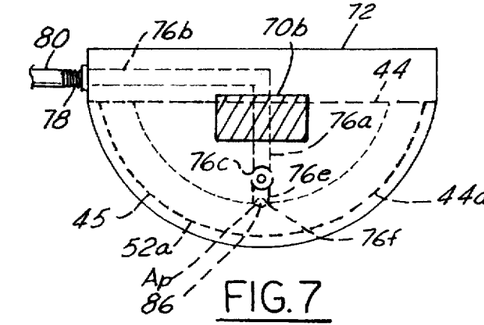
FIG. 7 is a partly sectional top view of the soap applicator, seen along line 7—7 in FIG. 6.

A preferred internal soap circuit 76 for the soap applicator 44 is depicted in FIGS. 6 and 7. An entry passage 76a in the body 45 of the soap applicator 44 passes from the rear of the soap applicator toward the front face 44a thereof. The soap applicator bracket 72 is provided with an interface passage 76b which communicates with the entry passage 76a. A suitable hose connector 78 is provided at an opening in the interface passage 76b for connecting thereto a flexible hose 80. A longitudinally oriented distribution passage 76c in the body 45 communicates with the entry passage 76a. A lower bead receptacle passage 76d in the body 45 communicates with the distribution passage 76c, wherein the lower bead receptacle passage terminates in a lower orifice 82 located at the apex $A_p$ of the convex shape of the lower bead receptacle 52b at an orientation normal thereto. A connector passage 76e in the body 45 communicates with the distribution passage 76c and further communicates with an upper bead receptacle passage 76f in the body 45, wherein the upper bead receptacle passage terminates in an upper orifice 84 parallel to the longitudinal length of the upper bead receptacle 52a. In this regard, an upper bead receptacle soap distribution groove 86 is formed in the body 45 along the longitudinal length of the the upper bead receptacle 52a at the apex $A_p'$ of the convex shape thereof. The upper bead receptacle soap distribution groove 86 is aligned with the upper orifice 84 and receives soap therefrom. The bead receptacle soap distribution groove 86 ensures that soap is delivered to the entire longitudinal length of the upper bead receptacle 52a whereby a tire 22 of any given size will operatively receive transfer of soap to a bead thereof which is located therein.

Now, with reference to FIGS. 10A through 10D, the selective advancement of tires 22 will be described.

As indicated hereinabove, tires are advanced into soaping position at the soaping station 25 via the urging of the driven rollers 30. In this regard, the driven rollers may be driven by in any suitable mechanism, such as for example a chain and sprocket drive 88 (see FIG. 1) driven by an electric motor (not shown).

Figure 10A:
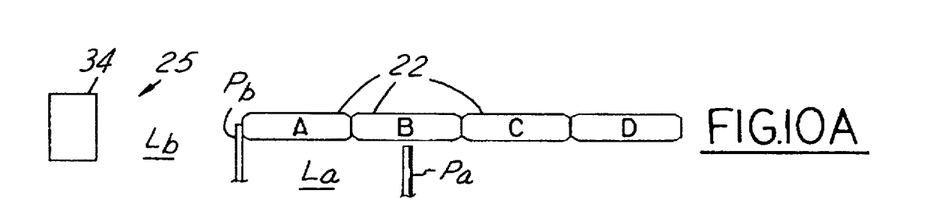
FIGS. 10A, 10B, 10C, and 10D depict schematically selective advancement of tires along the conveyor of the tire soaper apparatus according to the present invention.
Figure 10B:
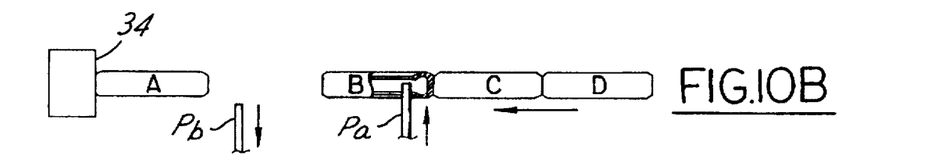
Figure 10C:
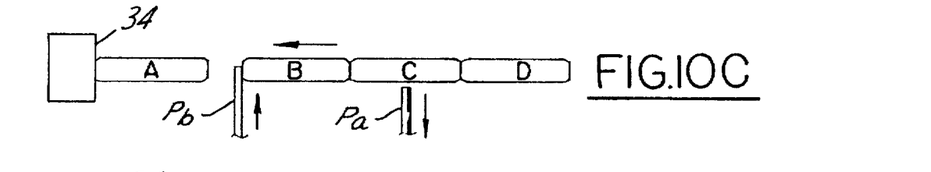
Figure 10D:
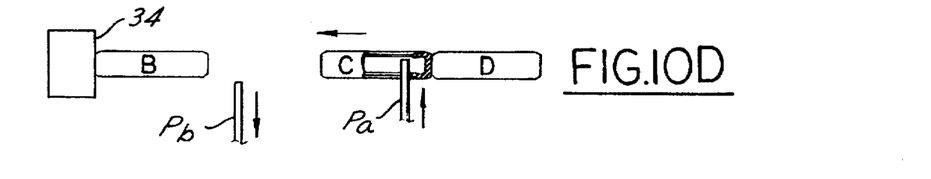

In order that the tires advance discretely with each soaping cycle, stop pins $P_a$, $P_b$ are provided which selectively abuttingly engage the tires 22 (individually distinguished by letters A through D) to regulate advancement thereof. A first stop pin $P_a$ is intended to restrain a line of tires so that when the second stop pin $P_b$ is retracted only one tire is advanced to the soaping station 25. The sequence is as follows. The first and second stop pins $P_a$, $P_b$ move oppositely into respective raised and lowered positions, with initially the first stop pin $P_a$ at the lowered position and the second stop pin $P_b$ at the raised position, as shown in FIG. 10A. As shown at FIG. 10B, the first stop pin $P_a$ is raised and the second stop pin $P_b$ is lowered to 1) allow tires B, C and D to advance toward location $L_a$ by the central opening of Tire B abutting the first stop pin $P_a$, and 2) allow only tire A to advance to location $L_b$ (ie., into soaping position) at the soaper station 25. Subsequently, the first stop pin $P_a$ is lowered and the second stop pin $P_b$ is raised to allow tire B to advance to location $L_a$, as shown in FIG. 10C. After tire A has been soaped at location $L_b$ (the soaper station 25) and ejected therefrom, the second stop pin $P_b$ is lowered and the first stop pin $P_a$ is raised to 1) allow only tire B to advance to location $L_b$, and 2) allow tires C and D to advance toward location $L_a$ by tire C abutting (in its central opening) the first stop pin $P_a$, as shown at FIG. 10D. Tire B is soaped and then ejected, whereupon the stop pins continue cycling as above recounted to thereby provide orderly advance of the tires in a discrete manner.

Figure 11:
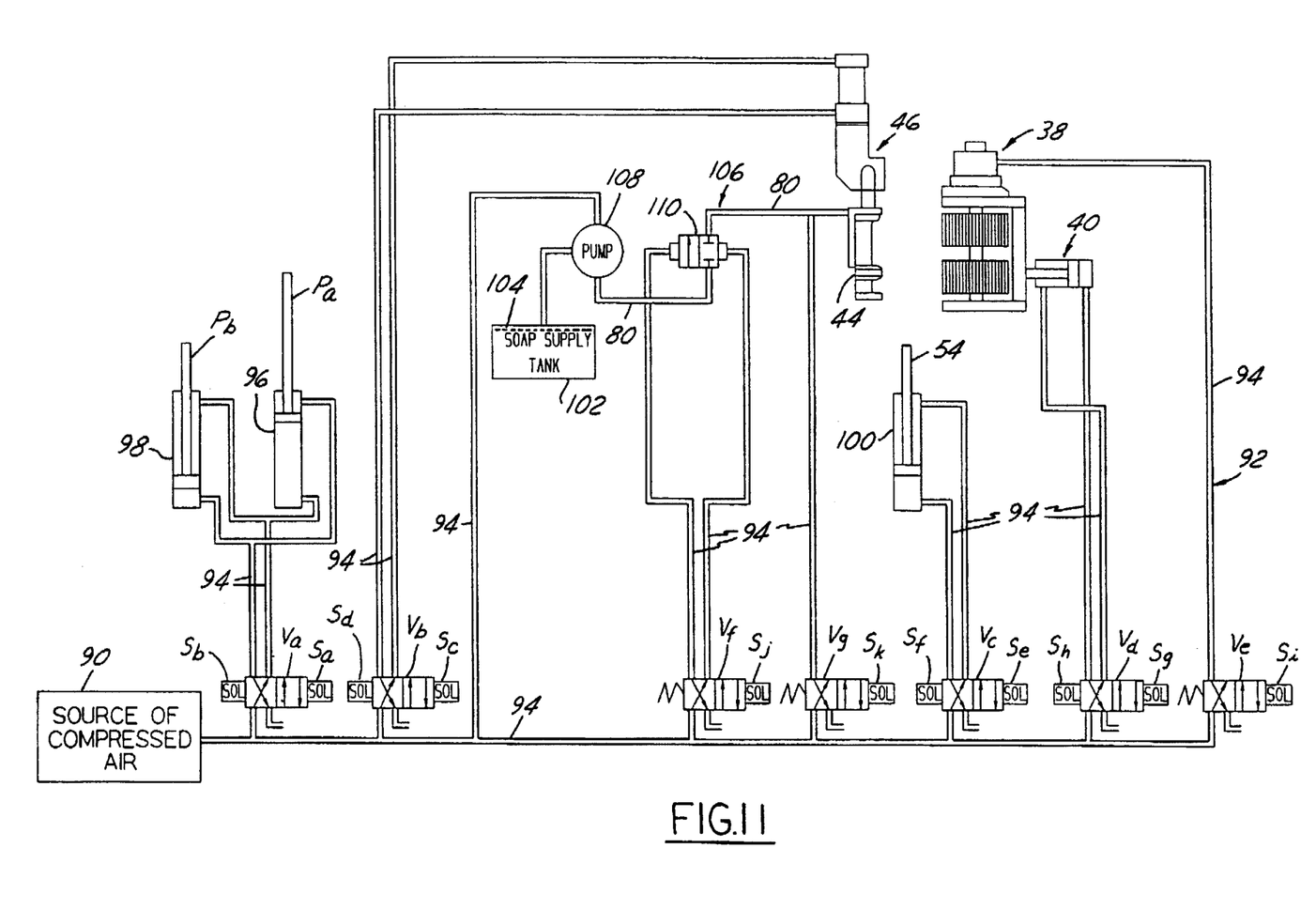
FIG. 11 is a schematic depiction of the pneumatic and soap circuits of the tire soaper apparatus according to the present invention.

Now turning to FIG. 11, the soap and pneumatic circuits will be discussed.

The pneumatic circuit 90 is connected to a source of compressed air 92 having conventional compressor, filter, pressure regulator and indicator components. Pneumatic hose 94 supplies the compressed air to the various constituents of the pneumatic circuit 90. A four-way pneumatic valve $V_a$ operated by solenoid $S_a$ and solenoid $S_b$ controls lowering and raising of the first and second stop pins $P_a$, $P_b$ via pneumatic piston-cylinder actuators 96, 98 connected respectively thereto and which are connected at preselected locations to the base frame 24. A four-way pneumatic valve $V_b$ operated by solenoid $S_c$ and solenoid $S_d$ controls actuation of the pivot mechanism 46. A four-way pneumatic valve $V_c$ operated by solenoid $S_e$ and solenoid $S_f$ controls actuation of the kicker 54 via a pneumatic cylinder-piston actuator 100 connected to the base frame 24, wherein the kicker is pivotally mounted to the base frame and pivotally moved by the actuator 100. A four-way pneumatic valve $V_d$ operated by solenoid $S_g$ and solenoid $S_h$ controls actuation of the translational drive 40. A four-way pneumatic valve $V_e$ operated by spring loaded solenoid $S_i$ controls operation of the rotary drive 38.

The soap circuit 106 includes a soap supply tank 102 (which may take the form, for example, of a 55 gallon drum) for providing a reservoir of liquid soap 104, soap hoses 80, a pneumatic pump 108 for pumping the soap 104 from the soap supply tank, a pneumatic flow valve 110, and the aforementioned soap applicator 44. A four-way pneumatic valve $V_f$ operated by spring loaded solenoid $S_j$ controls actuation of the flow valve 110 to thereby regulate delivery of soap 104 to the soap applicator. Finally, a four-way pneumatic valve $V_g$ operated by spring loaded solenoid $S_k$ controls purging of soap 104 from the soap applicator 44 after the flow valve 110 is closed.

Figure 12:
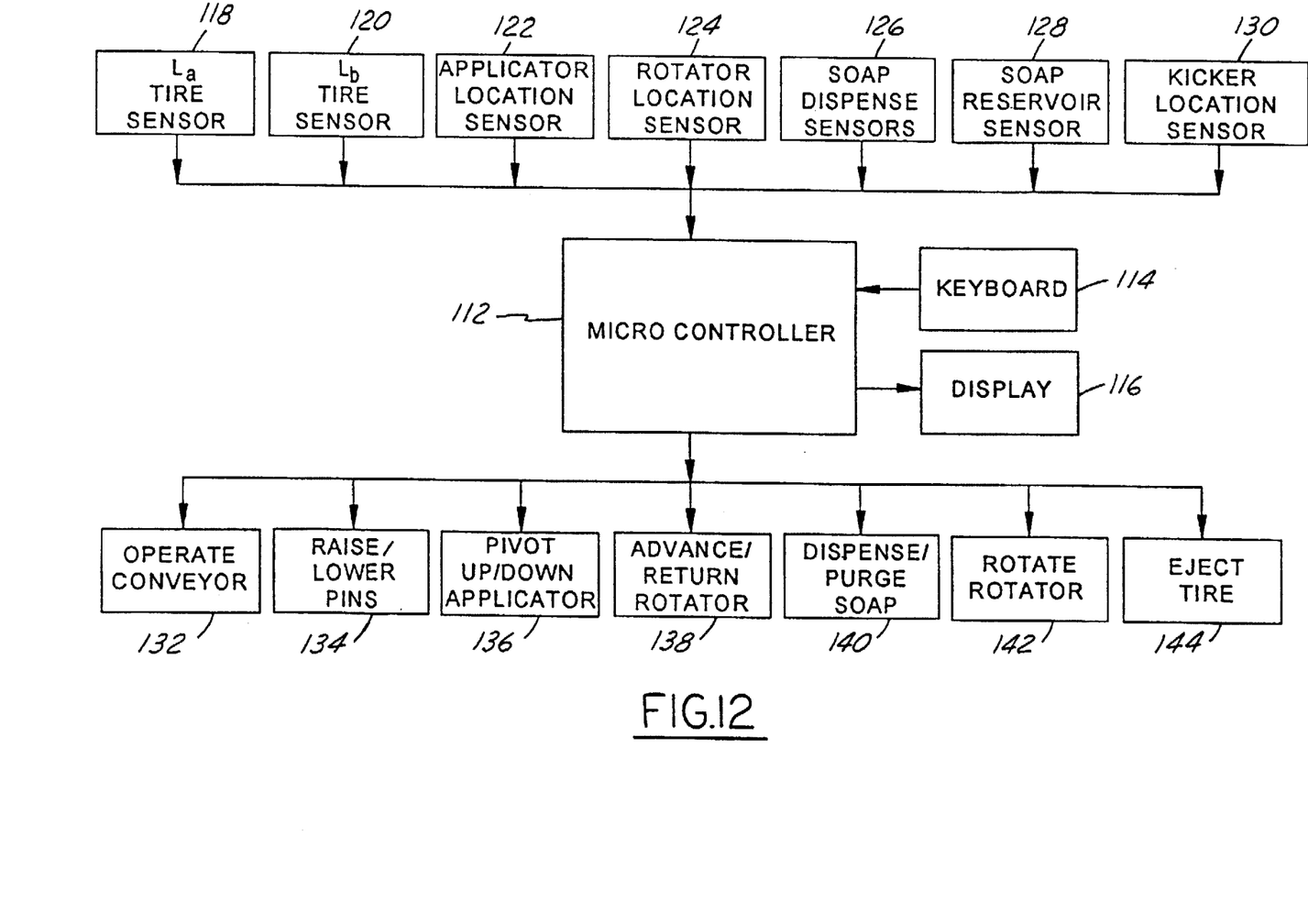
FIG. 12 is a schematic depiction of the electronic processor control of the tire soaper apparatus according to the present invention.

Referring now to FIG. 12, a schematic electrical circuit is depicted, wherein control of operation of the tire soaper apparatus 20 is provided by an electronic processor, such as a microprocessor used in microcomputers and controller devices.

The microprocessor 112 is provided with suitable interface electronics and is further provided with appropriate read only memory (ROM) and/or is provided with software programmable read only memory (RAM) such as from a floppy disk or other data storage media such as a hard drive or semiconductor chip.

While not required, it is optionally possible to include a keyboard 114 and a display 116 to thereby allow programming adjustment and display of programming information.

The microprocessor 112 is interfaced with a plurality of sensors which indicate the status of particular operations of the tire soaper apparatus 20. For example, a sensor 118 senses if a tire is located at location $L_a$, a sensor 120 senses if a tire is located at location $L_b$, a sensor 122 senses the pivotal position of the soap applicator 44, a sensor 124 senses the translational position of the rotator 34, and a sensor 130 senses the pivotal location of the kicker 54. While not respected, it is optionally possible to include other sensors, such as for example sensors 126 for sensing soap delivery at the orifices 82, 84 and a sensor 128 for sensing the fill level of the soap supply tank 102. Yet other sensors can be included, such as for example a pressure sensor to sense squeeze pressure on the tire between the soap applicator and the rotator and thereby, via generation of an appropriate signal to the translational drive 40 by the microprocessor, serve to define the translational movement of the rotator. The sensors are of conventional nature, being appropriate to the quantity intended to be sensed. For example, the sensors may be photoelectrically, electrically or mechanically based.

The sensed data is interpreted by the microprocessor 112 using the aforementioned software. The result is output to the various components of the tire soaper apparatus 20. For example, the microprocessor 112 will output a start conveyor signal 132 to the electric motor thereof, output a raise/lower stop pins signal 134 to solenoids $S_a$, $S_b$, output a pivot up/down soap actuator signal to solenoids $S_c$, $S_d$, output a translational advance/retract signal 138 to solenoids $S_g$, $S_h$, output soap dispense/purge signals 140 to solenoids $S_j$, $S_k$, output a rotate rotator signal 142 to solenoid $S_i$, and output an eject tire signal 144 to solenoid $S_e$. Other output signals can be provided.

Figure 13:
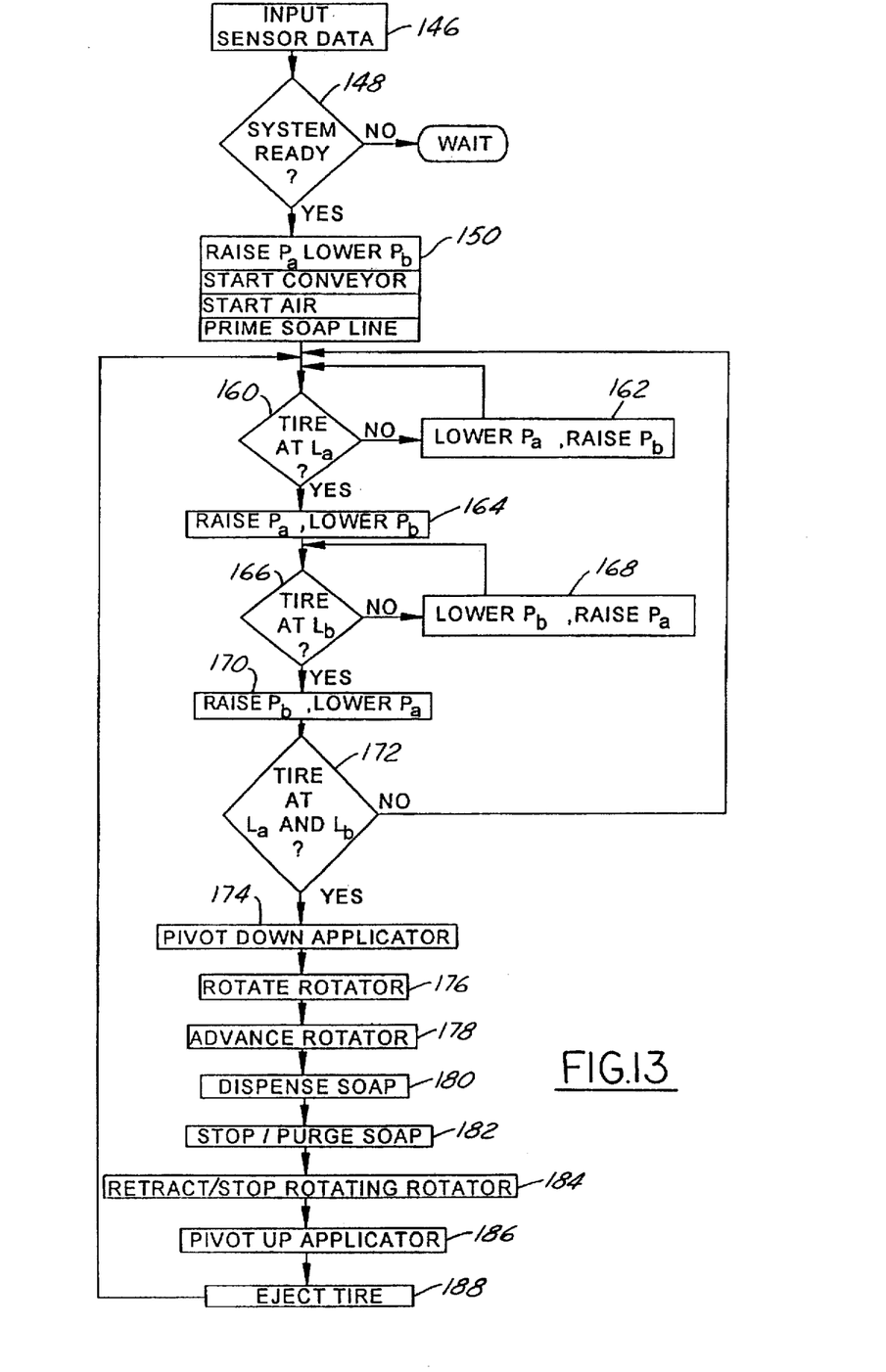
FIG. 13 is a schematic flow chart of an algorithm for carrying-out the electronic processor control of FIG. 12.

Referring now to FIG. 13 a schematic flow chart of an exemplar algorithm for carrying out the electronic circuit of FIG. 12 will be described.

At block 146 sense information from the sensors is provided to the microprocessor 112. The microprocessor interprets the sensed data based upon a software instructional program at decision block 148, and inquires whether the tire soaping apparatus 20 is ready for operation. If not it waits, otherwise, the microprocessor, at execution block 150, Sets the initial position of the stop pins $P_a$, $P_b$, starts the conveyor 26 by actuating the electric motor thereof, initiates the supply of compressed air 90 and starts the pump 108 to thereby prime the soap circuit 106. Next, at decision block 160, the microprocessor inquires whether a tire is located at location $L_a$. If not, the microprocessor at execution block 162 sends a signal to raise stop pin $P_b$ and lower stop pin $P_a$ and then re-inquires at decision block 160 whether a tire has advanced to location $L_a$; if a tire is detected at location $L_a$ the microprocessor at execution block 164 sends a signal to raise stop pin $P_a$ and lower stop pin $P_b$. The microprocessor next inquires at decision block 166 whether a tire is located at location $L_b$. If not, the microprocessor at execution block 168 sends a signal to raise stop pin $P_a$ and lower stop pin $P_b$ and then re-inquires at decision block 166 whether a tire has advanced to location $L_b$; if a tire is detected at location $L_b$ the microprocessor at execution block 170 sends a signal to lower stop pin $P_a$ and raise stop pin $P_b$. The microprocessor then inquires at decision block 172 whether a tire is present at each of locations $L_a$ and $L_b$. If not, the microprocessor returns to decision block 160 whereupon the tire advance sequence is revisited. If no tire advances, after a preset time the microprocessor sends a standby signal to Block 150 to thereby place the tire soaping apparatus in a wait state.

With a tire at the soaper station, the microprocessor generates and sends appropriate signals as follows. At execution block 174 the microprocessor sends a signal to pivot the soap applicator 44 to its deployed position; at execution block 176 the microprocessor sends a signal to start rotation of the rotator 34; at execution block 178 the microprocessor sends a signal to translationally advance the rotator toward the soap applicator; at execution block 180 the microprocessor sends signals to dispense soap to the soap applicator via the pump 108 and flow valve 110; at execution block 182 the microprocessor sends a signal to stop soap delivery via the flow valve and introduce compressed air into the internal soap circuit passages of the soap applicator to thereby purge them of soap; at execution block 184 the microprocessor sends signals to translationally retract the rotator and stop rotation of the rotator; at execution block 186 the microprocessor sends a signal to pivot the soap applicator 44 to its retracted position; and finally, at execution block 188 the microprocessor sends a signal to pivot the kicker 54 to eject the tire from the soaping station 25, whereupon the microprocessor returns to decision block 160.

In operation, the conveyor discretely advances tires to the soaping station as needed. When a tire reaches the soaping station, the soap applicator is pivoted to its deployed position whereat it is positioned into the central opening of the tire, the upper and lower bead receptacles being in alignment with respective beads of the tire. The rotator commences rotation and then translationally advances toward the soap applicator until the tire is squeezed therebetween with the rotator against the tread and the beads seated in the respective upper and lower bead receptacles (alternatively the rotator may commence rotation after the tire is squeezed). With the tire rotating on the free rollers of the conveyor in response to rotation of the rotator, liquid soap is delivered to the soap applicator, whereupon the beads of the tire become coated with soap. Because this is a coating process, there is little wasted soap. After perhaps 5 to 20 tire rotations, the soap flow is stopped and soap is purged therefrom. Then, the rotator is translationally retracted away from the soap applicator and rotation thereof ceases. The soap applicator is then pivoted back to its retracted position. Next, the kicker ejects the soaped tire to a conveyance for the tire mounting station, such as preferably for example that described in U.S. Pat. Nos. 5,094,284, 5,141,040 and 5,170,828. Now, the next tire is advanced to the soaping station and the cycle repeats, in rapid, predictable and efficient fashion.

It is to be understood that the term "tread" as used with reference herein means the road bearing surface of a tire and includes tires with or without an actual tread design (ie., slicks). Further, the term soap herein is used to mean any tire mounting liquid applied to the beads of a tire to facilitate mounting thereof to a wheel.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A tire soaping apparatus for applying soap to the beads of a tire prior to mounting the tire onto a wheel, said soaping apparatus comprising:

a base frame;

a soap applicator having an upper bead receptacle and a lower bead receptacle;

a rotator;

conveyor means connected with said base frame for selectively advancing tires thereupon toward said rotator;

rotation means, for rotating said rotator;

pivot means for pivoting said soap applicator from a retracted position above said conveyor means to a deployed position wherein said upper and lower bead receptacles face said rotator;

translation means for translationally moving said rotator toward and away from said deployed position of said soap applicator; and dispensor means for selectively dispensing soap at said upper and lower bead receptacles;

whereby when a tire is situated on said conveyor adjacent said rotator, said soap applicator pivots to said deployed position, said rotator translates toward said soap applicator so as to squeeze the tire therebetween, seat the beads of the tire respectively in said upper and lower bead receptacles, and cause rotator rotation to rotate the tire, and whereupon soap is dispensed from said upper and lower bead receptacles thereby soaping the beads of the tire.

2. The tire soaper apparatus of claim 1, further comprising electronic processor means for selectively actuating said conveyor means, said pivot means, said rotation means, said translation means, and said dispensor means to thereby provide the soaping of the tire.

3. The tire soaper apparatus of claim 1, further comprising kicker means connected with said base frame for ejecting a tire away therefrom.

4. The tire soaper apparatus of claim 1, further comprising electronic processor means for selectively actuating said conveyor means, said pivot means, said rotation means, said translation means, said dispensor means, and said kicker means to thereby provide the soaping of the tire and the ejection thereof thereafter.

5. The tire soaper apparatus of claim 1, wherein said soap applicator comprises a soaper body having a convex shaped front face, said front face having said upper and lower bead receptacles formed therein, wherein said upper and lower bead receptacles are mutually spaced apart a predetermined distance, and wherein said upper and lower bead receptacles are convex shaped; and wherein said dispensing means comprises:

an upper orifice at said upper bead receptacle;

a lower orifice at said lower bead receptacle; and soap circuit means for dispensing soap at said upper and lower orifices.

6. The tire soaper apparatus of claim 5, wherein said upper bead receptacle is longitudinally elongated; further wherein said upper bead receptacle has an apex therealong, said body having a groove formed therein along said apex of said upper bead receptacle, said groove being located with respect to said upper orifice so that said groove receives soap from said upper orifice when soap is dispensed therefrom.

7. The tire soaper apparatus of claim 6, wherein said dispenser means further comprises purge means for selectively purging soap from said soap circuit means at said soap applicator.

8. The tire soaper apparatus of claim 7, further comprising kicker means connected with said base frame for ejecting a tire away therefrom.

9. The tire soaper apparatus of claim 6, further comprising electronic processor means for selectively actuating said conveyor means, said pivot means, said rotation means, said translation means, said dispensor means, and said kicker means to thereby provide the soaping of the tire and the ejection thereof thereafter.

10. A tire soaping apparatus for applying soap to the beads of a tire prior to mounting the tire onto a wheel, said tire soaping apparatus comprising:

a soaping station comprising:

a base frame;

a soap applicator having an upper bead receptacle and a lower bead receptacle;

a rotator;

rotation means for rotating said rotator;

pivot means for pivoting said soap applicator from a retracted position above said conveyor means to a deployed position wherein said upper and lower bead receptacles face said rotator; and translation means for translationally moving said rotator toward and away from said deployed position of said soap applicator;

conveyor means for discretely advancing tires thereupon into said soaping station;

dispensor means for selectively dispensing soap at said upper and lower bead receptacles; and electronic processor means for selectively actuating said conveyor means, said pivot means, said rotation means, said translation means to thereby cause beads of a tire advanced by said conveyor means to be soaped by said upper and lower bead receptacles.

11. The tire soaper apparatus of claim 10, further comprising kicker means actuated by said electronic processor means for ejecting a tire away from said soaping station.

12. The tire soaper apparatus of claim 10, where said soap applicator comprises a soaper body having a convex shaped front face, said front face having said upper and lower bead receptacles formed there, where said upper and lower bead receptacles are mutually spaced apart a predetermined distance, and wherein said upper and lower bead receptacles are convex shaped; and wherein said dispensing means comprises:

an upper orifice at said upper bead receptacle;

a lower orifice at said lower bead receptacle; and soap circuit means for dispensing soap at said upper and lower orifices.

13. The tire soaper apparatus of claim 12, wherein said upper bead receptacle is longitudinally elongated; further wherein said upper bead receptacle has an apex therealong, said body having a groove formed therein along said apex of said upper bead receptacle, said groove being located with respect to said upper orifice so that said groove receives soap from said upper orifice when soap is dispensed therefrom.

14. The tire soaper apparatus of claim 13, wherein said dispenser means further comprises purge means for selectively purging soap from said soap circuit means at said soap applicator.

15. The tire soaper apparatus of claim 14, further comprising kicker means actuated by said electronic processor means for ejecting a tire away from said soaping station.

* * * * *